United States Patent

[11] 3,601,424

[72] Inventor Barrie J. Badland
  Bolton, England
[21] Appl. No. 862,312
[22] Filed Sept. 30, 1969
[45] Patented Aug. 24, 1971
[73] Assignee Mechanical Services (Trailer Engineers) Limited

[54] ROAD-VEHICLE SUSPENSION SYSTEMS
  5 Claims, 5 Drawing Figs.
[52] U.S. Cl. .................................... 280/124, 267/21
[51] Int. Cl. .................................... B60g 11/22
[50] Field of Search ........................... 280/124; 267/21, 21 A

[56] References Cited
  UNITED STATES PATENTS
  2,712,742  7/1955  Neidhart ................ 267/21 X
  2,998,981  9/1961  Derr ...................... 280/124
  3,204,979  9/1965  Lawson .................. 267/21 X
  3,436,069  4/1969  Henschen .............. 280/124 X Primary Examiner—Milton Buchler
Assistant Examiner—Carl A. Rutledge
Attorneys—Harry C. Bierman, Jordan B. Bierman and Bierman and Bierman ABSTRACT: A vehicle suspension system in which stub-axles for a pair of laterally spaced road wheels are mounted at the free ends of arms arranged to swing about a common horizontal axis, and in which each such arm and provided, at the end and side remote from the stub-axle, with a spindle extruding parallel to the latter and journaled at least at the outboard end of a tubular housing, the remainder of such spindle being of square section and having a length of rubber or other elastomeric cord compressed between each face thereof and an adjacent internal corner of the housing.

PATENTED AUG 24 1971

3,601,424

INVENTOR:
Barrie John Badland,
BY
Bierman & Bierman,
ATTORNEYS.

ROAD-VEHICLE SUSPENSION SYSTEMS

This invention relates to spring suspensions for supporting the bodies or underframes of road vehicles upon their wheel axles, and is particularly concerned with that type of suspension system in which stub-axles for a pair of laterally spaced wheels are mounted at the free ends of arms arranged to swing about a common horizontal axis against the resistance of resilient material in compression.

The object of the present invention is to provide a simple and trouble-free system of the type referred to which will be particularly suitable for use on trailer vehicles, although it may equally well be applied to other kinds of vehicle; for example, at the rear end of a front-wheel-driven motorcar.

According to this invention, in a spring suspension system of the type aforesaid, each swinging arm is provided, at the end and side remote from the stub-axle, with a spindle extending parallel to the latter and journaled at least the outboard end of a square tubular housing, the remainder of such spindle being of square section and having a length of rubber or other elastomeric cord compressed between each face thereof and an adjacent internal corner of the housing. In the accompanying drawings, FIG. 1 is a part-sectional rear elevation of the near-side half of a suspension system embodying the present invention;

FIGS. 2 and 3 are sections on the lines 2—2 and 3—3 respectively, of FIG. 1;

In the example illustrated in FIGS. 1 to 4, the tubular housing A for the spindle B of the swinging arm C carrying the stub axle D is 7 inches long, 2 inches square section overall, and has fixed in the outboard end thereof a bush (say one-eighth inch long) which may be of self-lubricating type, and secured by means of high-impact adhesive.

The spindle B is solid and of 1⅛ inches square section except where a journal F (say, 1 inch in diameter) is turned thereon for engagement by the bush E, such bush being split diametrally (see FIG. 2) to allow of its being fitted around the journal before being fixed in the housing A. The arm C is fixed upon the projecting end of the spindle B in any suitable manner.

The spindle B normally has its square section angularly offset by 45° with reference to the housing A, which latter may be secured to the chassis or underframe of the vehicle by means of angle irons G welded along opposite sides thereof.

Figure 3:
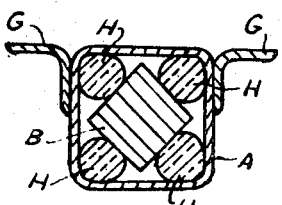

To resist rotation of the spindle B in the housing A under the weight of the underframe aforesaid (and of the body or other load thereon), lengths of tough cord rubber H are interposed between its flat faces and the adjacent internal corners of the housing A. These elastomeric inserts have a certain degree of initial compression but do not completely fill the space available as shown in FIG. 3.

It will be appreciated that relative angular movement of the spindle B and housing A is necessarily accompanied by a nonadherent rolling movement and additional compression of the several elastomeric inserts H, albeit without any possibility of the latter permitting the arm C to move more than (say) 45° with reference to the housing A.

Figure 1:
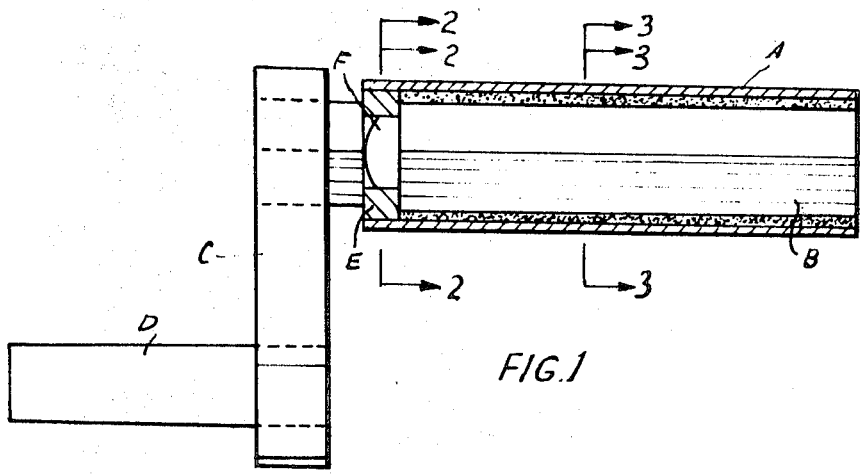
Figure 2:
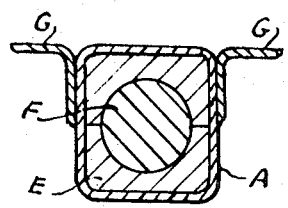
Figure 4:
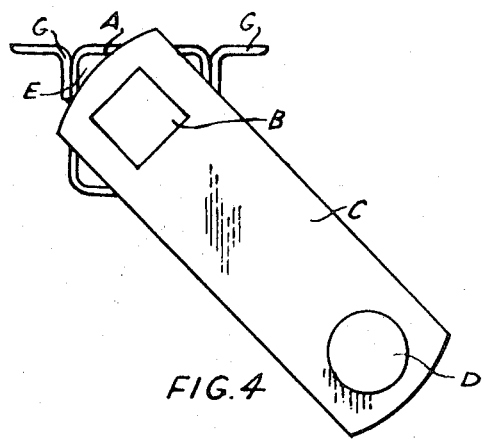
FIG. 4 is a left-hand side elevation of the assembly shown in FIG. 1.
Figure 5:
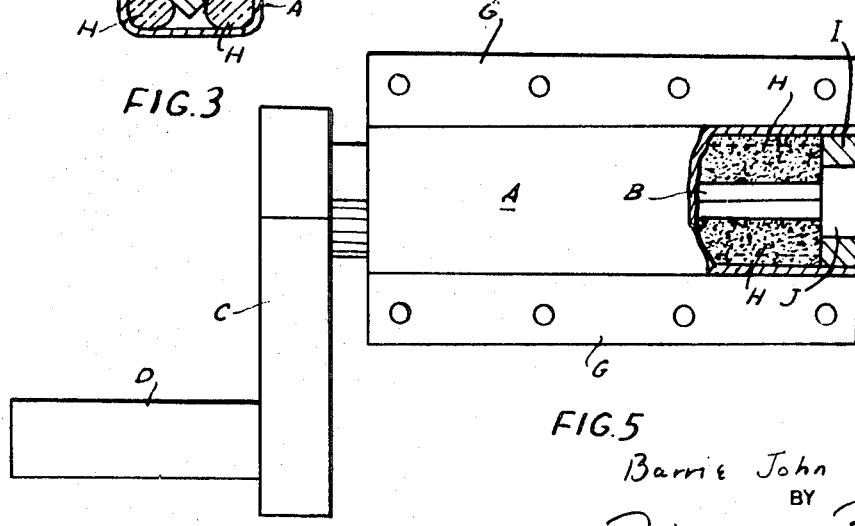
FIG. 5 is a plan view of a modified construction of such assembly.

If desired, a further undivided bush I may be fixed in the inboard end of the housing A to receive a second journal J turned on the square spindle B (FIG. 5), but it has been found that a single bearing such as is shown in FIG. 1 is sufficient to prevent any substantial loss of coaxiality between the spindle B and housing A, and that ingress of dust at the inboard end of the housing A can be effectively prevented by a blank cap (not shown).

I claim:

1. A road-vehicle suspension system comprising two tubular housings adapted to be fixed transversely of the vehicle in mutual alignment, spindles extending lengthwise of said housings and journaled at the outboard ends thereof by means of a two-part bush located within the said housings, said bush being split diametrically to permit fitting of the said bush around said spindle before the spindle is fitted in its housing, said spindles being of square section except at the journaled portions, lengths of elastomeric cord compressed between the several faces of said square-section spindle portions and adjacent internal corners of said housings, arms fixed to the outboard ends of said spindles externally of said housings, and stub-axles for road wheels projecting outwardly from the free ends of said arms.

2. A road-vehicle suspension system according to claim 1, wherein each tubular housing is itself of square section, the square section of the associated spindle being normally located by the interposed elastomeric cords with a circumferential offset of 45° with reference to said housing.

3. A road-vehicle suspension system according to claim 1, wherein each tubular housing is itself of square section and angle irons are welded along opposite sides thereof for use in securing it to the vehicle.

4. A road-vehicle suspension system according to claim 1, wherein each spindle is additionally journaled at the inboard end of the associated housing.

5. A road-vehicle suspension system according to claim 1, wherein a square-section portion of each spindle beyond the outboard journal thereof is fixed in a complementary hole in the adjacent axle-carrying arm.